(12) United States Patent
Kang et al.

(10) Patent No.: US 12,200,370 B2
(45) Date of Patent: Jan. 14, 2025

(54) ELECTRONIC DEVICE FOR PROCESSING CONTINUOUS SHOOTING INPUT AND METHOD THEREOF

(71) Applicant: Samsung Electronics Co., Ltd., Suwon-si (KR)

(72) Inventors: Changhoon Kang, Suwon-si (KR); Byounggeun Choi, Suwon-si (KR); Subin Kim, Suwon-si (KR); Beomjoon Kwon, Suwon-si (KR); Bohyun Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/169,489

(22) Filed: Feb. 15, 2023

(65) Prior Publication Data

US 2023/0199330 A1    Jun. 22, 2023

Related U.S. Application Data

(63) Continuation of application No. PCT/KR2022/011919, filed on Aug. 10, 2022.

(30) Foreign Application Priority Data

Sep. 6, 2021    (KR) .................... 10-2021-0118401

(51) Int. Cl.
*H04N 23/743*    (2023.01)
*H04N 5/265*    (2006.01)
*H04N 23/82*    (2023.01)

(52) U.S. Cl.
CPC ............. *H04N 23/82* (2023.01); *H04N 5/265* (2013.01); *H04N 23/743* (2023.01)

(58) Field of Classification Search
CPC .................... H04N 23/667; H04N 23/743
(Continued)

(56) References Cited

U.S. PATENT DOCUMENTS

| 8,416,338 B2 | 4/2013 | Nagasaka et al. |
| 8,692,900 B2 | 4/2014 | Denisenkov et al. |

(Continued)

FOREIGN PATENT DOCUMENTS

| EP | 3 926 945 A1 | 12/2021 |
| JP | 5163446 B2 | 3/2013 |

(Continued)

OTHER PUBLICATIONS

International Search Report dated Nov. 18, 2022, issued in International Application No. PCT/KR2022/011919.

(Continued)

*Primary Examiner* — Anthony J Daniels
(74) *Attorney, Agent, or Firm* — Jefferson IP Law, LLP

(57) ABSTRACT

An electronic device is provided. The electronic device includes a camera, a memory, and at least one processor electrically coupled to the camera and the memory. The at least one processor may obtain a plurality of image frames through the camera, in response to a shooting start command, obtain a shooting command subsequent to the shooting start command, select a first number of image frames from among the plurality of image frames obtained before the shooting command, in response to the shooting command, and generate a first image synthesized based on the selected first number of image frames.

18 Claims, 9 Drawing Sheets

(58) Field of Classification Search
USPC .................................................. 348/220.1
See application file for complete search history.

(56) References Cited

U.S. PATENT DOCUMENTS

| | | | |
|---|---|---|---|
| 9,042,439 | B2 | 5/2015 | Lee et al. |
| 9,503,652 | B2 | 11/2016 | Chen et al. |
| 9,516,234 | B2 | 12/2016 | Baek et al. |
| 9,628,721 | B2 | 4/2017 | Moon et al. |
| 9,870,619 | B2 | 1/2018 | Sohn et al. |
| 2014/0300774 | A1 | 10/2014 | Gwak et al. |
| 2017/0034451 | A1 | 2/2017 | Lee et al. |
| 2017/0048450 | A1 | 2/2017 | Lee et al. |
| 2017/0150041 | A1* | 5/2017 | Huang ................... H04N 23/57 |
| 2019/0370948 | A1 | 12/2019 | Tico et al. |
| 2021/0400182 | A1* | 12/2021 | Eagleston ............... H04N 23/80 |

FOREIGN PATENT DOCUMENTS

| | | |
|---|---|---|
| JP | 5720368 B2 | 5/2015 |
| JP | 2015-179969 A | 10/2015 |
| KR | 10-0779875 B1 | 11/2007 |
| KR | 10-2014-0112887 A | 9/2014 |
| KR | 10-1894531 B1 | 9/2018 |
| KR | 10-1943318 B1 | 1/2019 |
| KR | 10-2207633 B1 | 1/2021 |
| WO | 2016/167014 A1 | 10/2016 |
| WO | 2020/077513 A1 | 4/2020 |

OTHER PUBLICATIONS

European Search Report dated Oct. 21, 2024, issued in European Application No. 22864901.8.

* cited by examiner

ELECTRONIC DEVICE FOR PROCESSING CONTINUOUS SHOOTING INPUT AND METHOD THEREOF

CROSS-REFERENCE TO RELATED APPLICATION(S)

This application is a continuation application, claiming priority under § 365(c), of an International application No. PCT/KR2022/011919, filed on Aug. 10, 2022, which is based on and claims the benefit of a Korean patent application number 10-2021-0118401, filed on Sep. 6, 2021, in the Korean Intellectual Property Office, the disclosure of which is incorporated by reference herein in its entirety.

TECHNICAL FIELD

The disclosure relates to an electronic device for performing an image processing operation, and a method thereof more particularly, the disclosure relates to a technique in which an electronic device for performing a continuous shooting input obtains and processes an image.

BACKGROUND ART

Various types of electronic devices, such as a mobile communication terminal, a personal digital assistant (PDA), an electronic organizer, a smart phone, a tablet personal computer (PC), and/or a wearable device are widely used. In addition, hardware and software of the electronic device are constantly being improved.

For example, in a preview mode, the electronic device may display an image obtained from a camera embedded in the electronic device as a preview image. In addition, the electronic device may obtain a shooting start command when a user presses a shooting button (e.g., a shutter button), and may store an image obtained from the camera after the user presses the shooting button. In addition, the electronic device may provide continuous shooting. The continuous shooting may represent shooting in which a shooting input subsequent to a shooting start input is repeated in a short time. For example, in the presence of an input of the continuous shooting from the user of the electronic device, the electronic device may perform a shooting operation which is repeated in a short time in response to the input of the continuous shooting command.

The electronic device may obtain the shooting input subsequent to the shooting start input, and may correct an image (e.g., a raw image) obtained through the camera after the shooing input. For example, the electronic device may provide a corrected image to the user by synthesizing some of image frames obtained after the shooting input. Therefore, the electronic device may provide an image with improved image quality.

The above information is presented as background information only to assist with an understanding of the disclosure. No determination has been made, and no assertion is made, as to whether any of the above might be applicable as prior art with regard to the disclosure.

DISCLOSURE

Technical Problem

According to the technique of the related art, an electronic device (e.g., a mobile device) generates an image synthesized based on a plurality of image frames obtained after a shooting command, when the shooting command is obtained repeatedly upon obtaining a continuous shooting command. Therefore, it takes time to obtain image frames to be synthesized after the shooting command.

In addition, according to the technique of the related art, after the shooting command is obtained, the electronic device is not able to process a new shooting command while a processor collects image frames to generate a synthesized image. For example, while the user of the electronic device requests for a shooting command and the processor collects and synthesizes image frames obtained after the shooting command, the electronic device is not able to process the shooting command even if the user requests for the shooting command. Therefore, the user has a limitation in shooting a subject to be shot.

The electronic device, according to the technique of the related art, shall collect image frames to be synthesized in response to the shooting command. Therefore, there is an issue in that the user is not able to perform a necessary operation (e.g., a sharing operation, a transmission operation) without delay of an image (e.g., a synthesized image) for which quality improvement has been complete.

Aspects of the disclosure are to address at least the above-mentioned problems and/or disadvantages and to provide at least the advantages described below. Accordingly, as aspect of the disclosure is to provide an electronic device for performing an image processing operation, and a method thereof.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a camera, a memory, and at least one processor electrically coupled to the camera and the memory. The at least one processor is configured to obtain a plurality of image frames through the camera, in response to a shooting start command, obtain a shooting command subsequent to the shooting start command, select a first number of image frames from among the plurality of image frames obtained before the shooting command, in response to the shooting command, and generate a first image synthesized based on the selected first number of image frames.

In accordance with another aspect of the disclosure, a method of operating an electronic device is provided. The method includes obtaining a plurality of image frames through a camera included in the electronic device, in response to a shooting start command, obtaining a shooting command subsequent to the shooting start command, selecting a first number of image frames from among the plurality of image frames obtained before the shooting command, in response to the shooting command, and generating a first image synthesized based on the selected first number of image frames.

In accordance with another aspect of the disclosure, at least one non-transitory recording medium storing computer readable instructions is provided. The at least one non-transitory recording medium is configured to perform obtaining a plurality of image frames through a camera, in response to a shooting start command, obtaining a shooting command subsequent to the shooting start command, select a first number of image frames from among the plurality of image frames obtained before the shooting command, in response to the shooting command, and generating a first image synthesized based on the selected first number of image frames.

Advantageous Effects

According to various embodiments of the disclosure, an electronic device may obtain a plurality of image frames in response to a shooting start command. In addition, the electronic device may use some of image frames obtained before a shooting command, in response to the shooting command subsequent to the shooting start command.

An electronic device according to various embodiments of the disclosure may use image frames obtained before a shooting command, thereby reducing a time required to generate an image synthesized in response to the shooting command.

An electronic device according to various embodiments of the disclosure may synthesize image frame obtained from a shooting command, thereby providing an image with improved quality.

An electronic device according to various embodiments of the disclosure may reduce a time for which a processor collects image frames after a shooting command, thereby more immediately processing a subsequent shooting command.

An electronic device according to various embodiments of the disclosure may store image frames obtained from a camera in response to a shooting start command (e.g., a first input shooting command) when there is a continuous shooting command from a user, and generate a synthesized image based on the stored image frames, thereby providing an image with improved quality.

Advantages acquired in the disclosure are not limited to the aforementioned advantages, and other advantages not mentioned herein may be clearly understood by those skilled in the art to which the disclosure pertains from the following descriptions.

DESCRIPTION OF DRAWINGS

Throughout the drawings, like reference numerals will be understood to refer to like parts, components, and structures.

MODE FOR INVENTION

Figure 1:
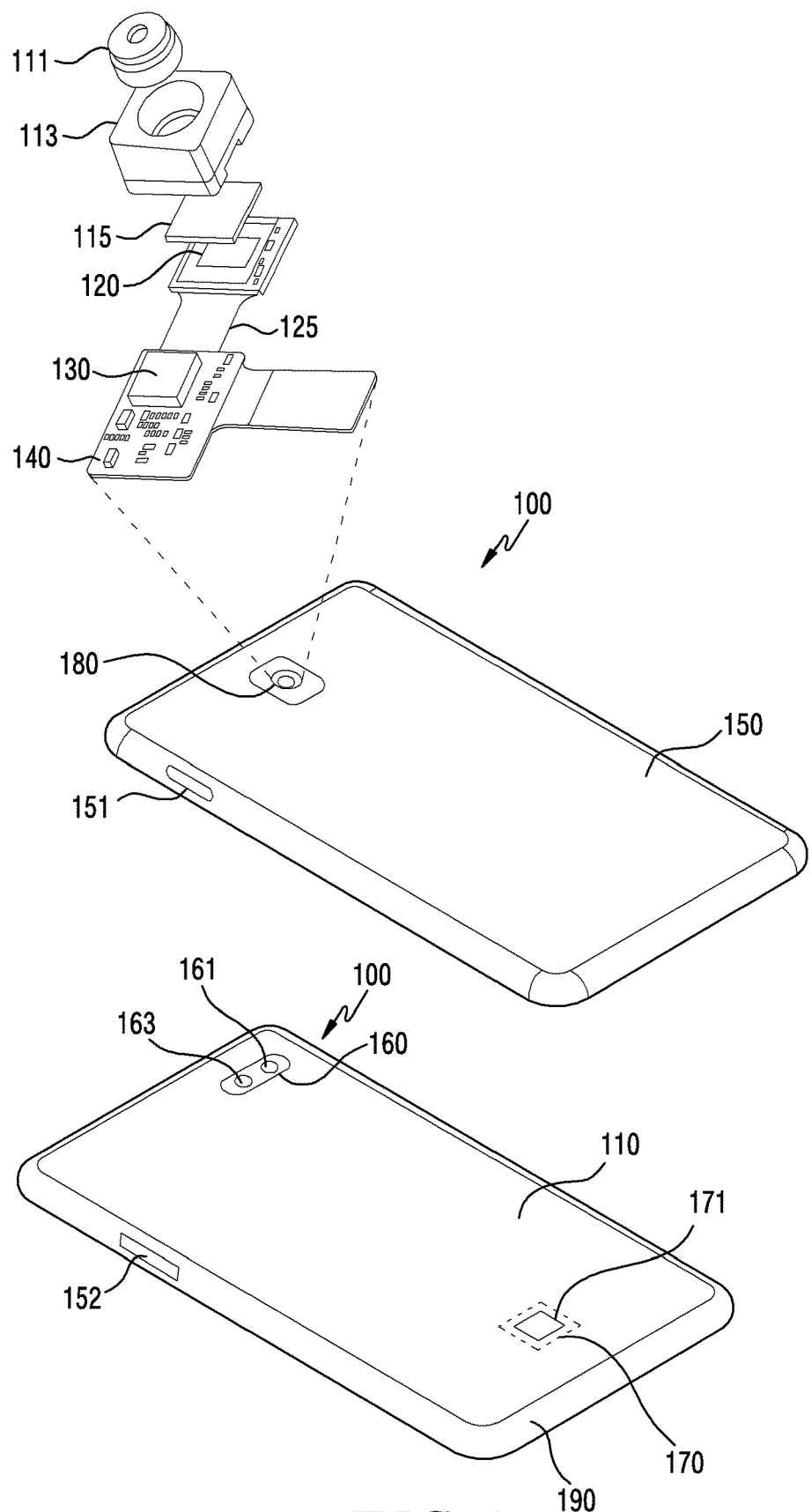
FIG. 1 illustrates a structure for an electronic device and a camera module according to an embodiment of the disclosure.

FIG. 1 illustrates a structure for an electronic device and a camera module according to an embodiment of the disclosure.

FIG. 1 is a schematic view of a camera module 180 and an exterior of an electronic device 100 having the camera module 180 mounted thereon, according to an embodiment. Although the embodiment of FIG. 1 is illustrated and described on the premise of a mobile device, for example, a smart phone, it is applicable to an electronic device having a camera mounted thereon among various electronic devices or mobile devices, which will be clearly understood by those ordinarily skilled in the art.

Referring to FIG. 1, a display 110 may be disposed on a front face of the electronic device 100 according to an embodiment of the disclosure. In an embodiment of the disclosure, the display 110 may occupy most of the front face of the electronic device 100. The display 110 and a region of a bezel 190 surrounding at least some edges of the display 110 may be disposed to the front face of the electronic device 100. The display 110 may include a flat area and a curved area extending from the flat area toward a side face of the electronic device 100. The electronic device 100 illustrated in FIG. 1 is an example, and various embodiments are possible. For example, the display 110 of the electronic device 100 may include only a flat area without a curved area, or may have a curved area only at one edge, not both edges. In addition, in an embodiment of the disclosure, the curved area may extend toward a rear face of the electronic device 100 so that the electronic device 100 includes an additional flat area.

In an embodiment of the disclosure, the electronic device 100 may additionally include a speaker (not shown), a receiver (not shown), a front camera 161, a proximity sensor (not shown), and/or a home key (not shown). The electronic device 100 according to an embodiment of the disclosure may be provided in such a manner that a rear cover 150 is integrated with a main body of the electronic device. In another embodiment of the disclosure, the rear cover 150 may be separated from the main body of the electronic device 100, so as to have a shape capable of replacing a battery. The rear cover 150 may also be referred to as a battery cover or a back cover.

In an embodiment of the disclosure, a fingerprint sensor 171 for recognizing a user's fingerprint may be included in a first area 170 of the display 110. When the display 110 is viewed from the front, since the fingerprint sensor 171 is disposed to a lower layer of the display 110, it may not be recognized by the user or may be difficult to be viewed. In addition to the fingerprint sensor 171, a sensor for additional user/biometric authentication may be disposed to some areas of the display 110. In another embodiment of the disclosure, a sensor for user/biometric authentication may be disposed in one area of the bezel 190. For example, an infrared (IR) sensor for iris authentication may be exposed through one area of the display 110, or may be exposed through one area of the bezel 190.

In an embodiment of the disclosure, the front camera 161 may be disposed to a second area 160 of the front face of the electronic device 100. Although it is illustrated in the embodiment of FIG. 1 that the front camera 161 is visually exposed through one area of the display 110, in another embodiment of the disclosure, the front camera 161 may be visually exposed through the bezel 190. In another embodiment of the disclosure, the display 110 may include at least one of an audio module, a sensor module (e.g., a sensor 163), a camera module (e.g., the front camera 161), and a light emitting device (not shown), on a rear face of the second region 160. For example, a camera module may be disposed on the front and/or side face of the electronic device 100 to face the front and/or the side face. For example, the front camera 161 may be an under display camera (UDC) which is not visually exposed to the second area 160.

In an embodiment of the disclosure, the electronic device 100 may include one or more front cameras 161. For example, the electronic device 100 may include two front cameras, such as a first front camera and a second front camera. In an embodiment of the disclosure, the first front camera and the second front camera may be the same-type cameras of the same specifications (e.g., pixels), but in another embodiment of the disclosure, the first front camera and the second front camera may be implemented as cameras of different specifications. The electronic device 100 may support a function related to a dual camera (e.g., three-dimensional (3D) shooting, auto focus, or the like) through the two front cameras. Descriptions of the aforementioned front camera may be applied to the rear camera of the electronic device 100 in the same or similar manner.

In an embodiment of the disclosure, a variety of hardware, such as a flash for assisting shooting or the sensor 163 may be additionally disposed to the electronic device 100. For example, the electronic device 100 may include a distance sensor (e.g., a time of flight (TOF) sensor) for detecting a distance between a subject and the electronic device 100. The distance sensor may be applied to both the front camera 161 and/or the rear camera. The distance sensor may be separately disposed or may be included to be disposed on the front camera 161 and/or the rear camera.

In an embodiment of the disclosure, at least one physical key may be disposed on a side portion of the electronic device 100. For example, a first function key 151 for turning on/off the display 110 or turning on/off power of the electronic device 100 may be disposed to a right edge with respect to the front face of the electronic device 100. In an embodiment of the disclosure, a second function key 152 for controlling volume or screen brightness of the electronic device 100 may be disposed to a left edge with respect to the front face of the electronic device 100. In addition thereto, an additional button or key may also be disposed to the front or rear face of the electronic device 100. For example, a physical button or touch button mapped to a designated function may be disposed to a lower area of the bezel 190 of the front face.

The electronic device 100 illustrated in FIG. 1 corresponds to one example, and does not limit a type of the device to which the technical idea disclosed in the disclosure is applied. For example, the technical idea of the disclosure may also be applied to a foldable electronic device which is foldable in a horizontal or vertical direction by adopting a flexible display and a hinge structure, a rollable electronic device which is rollable, a table, or a laptop computer.

Referring to FIG. 1, the electronic device 100 according to an embodiment of the disclosure may include the camera module 180. The camera module 180 may include a lens assembly 111, a housing 113, an infrared cut filter 115, and/or an image sensor 120. The electronic device 100 may include an image signal processor (ISP) 130 electrically coupled to the image sensor 120. In an embodiment of the disclosure, it may be understood that the ISP 130 is included in the camera module 180, and in another embodiment of the disclosure, it may be understood that the ISP 130 is configured to be included in a processor (e.g., a processor 210 of FIG. 2) by being distinguished from the camera module 180.

In an embodiment of the disclosure, the lens assembly 111 may have lenses which are different in number, deployment, and/or type depending on the front camera 161 and a rear camera. According to the type of the lens assembly 111, the front camera 161 and the rear camera may have different characteristics (e.g., focal length and maximum magnification). The lens assembly 111 may move forward and backward along an optical axis (not shown), and may operate such that a subject, i.e., a target object, is clearly captured by changing a focal length.

In an embodiment of the disclosure, the camera module 180 may include the housing 113 including a barrel (not shown) including the lens assembly 111 aligned on an optical axis, at least one coil (not shown) surrounding a circumference of the barrel about the optical axis, and/or a magnet (not shown). In an embodiment of the disclosure, the camera module 180 uses at least one coil and/or magnet included in the housing 113 to perform a stabilization function (e.g., optical image stabilization (OIS)) of an image obtained by the image sensor 120. For example, the at least one coil and magnet may electromagnetically interact with each other under the control of the control circuit. For example, the camera module 180 may control electromagnetic force by controlling a direction and/or intensity of current passing through the at least one coil under the control of the processor, and may move (or rotate) the lens assembly 111 and at least part of a lens carrier (not shown) including the lens assembly 111 in a direction substantially perpendicular to the optical axis by using Lorentz force caused by electromagnetic force.

In an embodiment of the disclosure, for the image stabilization function, the camera module 180 may use a different method. For example, the camera module 180 may use video digital image stabilization (VDIS). In an embodiment of the disclosure, the camera module 180 may use a method of correcting image shaking by performing software processing on a data output value of the image sensor 120. For example, the camera module 180 may extract a motion vector based on a difference between frames of an image through the VDIS, which is a digital shaking compensation, and may increase sharpness through image processing. In addition, the camera module 180 may extract a motion vector based on the image through the VDIS, and may recognize not only the shaking of the electronic device 100 but also a motion of the subject itself, as shaking.

In an embodiment of the disclosure, the infrared cut filter 115 may be disposed to an upper face of the image sensor 120. For example, the infrared cut filter 115 may be disposed between the image sensor 120 and the lens assembly 111. Therefore, an image of a subject which has passed through the lens assembly 111 may be partially filtered by the infrared cut filter 115 and then detected by the image sensor 120.

In an embodiment of the disclosure, the image sensor 120 may be disposed to an upper face of a printed circuit board 140 (e.g., a printed circuit board (PCB), a printed board assembly (PBA), a flexible PCB (FPCB), or a rigid-flexible PCB (RFPCB)). The image sensor 120 may be electrically coupled to the ISP 130 coupled to the printed circuit board 140 by means of a connector 125. The FPCB or a cable may be used as the connector 125.

In an embodiment of the disclosure, the image sensor 120 may be a complementary metal oxide semiconductor (CMOS) sensor or a charged coupled device (CCD) sensor.

A plurality of individual pixels are integrated in the image sensor 120, and each individual pixel may include a micro lens, a color filter, and/or a photodiode. Each individual pixel is a type of a photodetector capable of converting incoming light into an electrical signal. The photodetector may include a photodiode (PD). For example, the image sensor 120 may amplify current generated by light received through the lens assembly 111 by using a photoelectric effect of a light receiving element. For example, each individual pixel may include a photoelectric transformation element (or a position sensitive detector (PSD)) and a plurality of transistors.

In an embodiment of the disclosure, information of subject's light incident through the lens assembly 111 may be converted into an electrical signal by the image sensor 120 and input to the ISP 130.

In an embodiment of the disclosure, when the ISP 130 and the image sensor 120 are physically separated, a sensor interface conforming to an appropriate standard may electrically couple the image sensor 120 and the ISP 130.

In an embodiment of the disclosure, the ISP 130 may perform image processing on the electrically converted image data. An image processing operation in the ISP 130 may be divided into a pre-ISP (hereinafter, pre-processing) and an ISP chain (hereinafter, post-processing). Image processing before a demosaicing operation may mean pre-processing, and image processing after the demosaicing operation may mean post-processing. The pre-processing operation may include 3 A processing, lens shading correction, edge enhancement, dead pixel correction, and/or knee correction. The 3 A may include at least one of auto white balance (AWB), auto exposure (AE), and auto focusing (AF). The post-processing operation may include at least one of changing of a sensor index value, changing of a tuning parameter, and adjusting of a screen ratio. The post-processing operation may include an operation of processing image data output from the image sensor 120 or image data output from a scaler. The ISP 130 may adjust at least one of contrast, sharpness, saturation, and dithering of the image through the post-processing operation. Herein, a procedure of adjusting contrast, sharpness, and/or saturation may be performed in a YUV color space, and a dithering procedure may be performed in a red, green, blue (RGB) color space. Some of the pre-processing operations may be performed in the post-processing operation, or some of the post-processing operations may be performed in the pre-processing operation. In addition, some of the pre-processing operations may overlap with some of the post-processing operations.

In an embodiment of the disclosure, the camera module 180 may be disposed not only to the rear face of the electronic device 100 but also to the front face. In addition, the electronic device 100 may include not only the single camera module 180 but also several camera modules to improve camera performance. For example, the electronic device 100 may further include the front camera 161 for video call or selfie shooting. The front camera 161 may support a relatively low number of pixels compared to a rear camera module. The front camera 161 may be relatively smaller than the camera module 180 of a rear camera.

Figure 2:
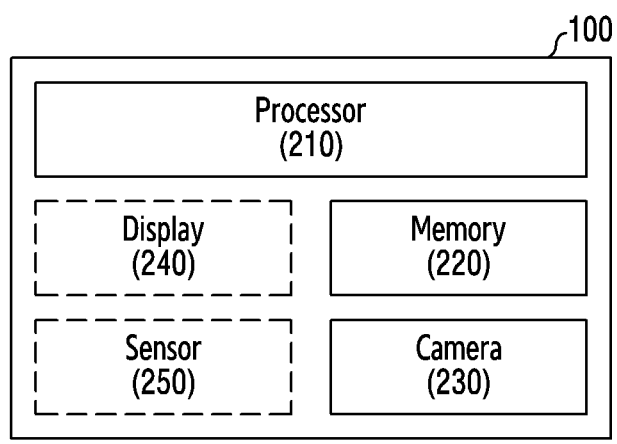
FIG. 2 is a block diagram of an electronic device according to an embodiment of the disclosure.

FIG. 2 is a block diagram of an electronic device according to an embodiment of the disclosure.

Referring to FIG. 2, the electronic device 100 may include a processor 210, a memory 220, a camera 230, a display 240, and/or a sensor 250. According to various embodiments of the disclosure, the electronic device 100 may include additional components in addition to the components illustrated in FIG. 2, or at least one of the components illustrated in FIG. 2 may be omitted. Among the configurations illustrated in FIG. 2, the configuration described in FIG. 1 may be briefly described or a description thereof may be omitted.

According to an embodiment of the disclosure, the processor 210 may use instructions stored in the memory 220 of the electronic device 100 to control at least one different component of the electronic device 100 and/or perform computation or data processing related to communication. According to an embodiment of the disclosure, it may be understood that the processor 210 includes at least one processor. For example, it may be understood that the processor 210 includes a central processing unit (CPU), a graphics processing unit (GPU), a micro controller unit (MCU), a sensor hub, a supplementary processor, a communication processor, an application processor, an application specific integrated circuit (ASIC), a field programmable gate arrays (FPGA), an image signal processor (ISP), and/or a communication processor (CP). The processor 210 may have a plurality of cores.

According to an embodiment of the disclosure, the memory 220 may store instructions, when executed, causing the processor 210 to process data so that an operation of the electronic device 100 is performed or to control a component of the electronic device 100. In addition, the memory 220 may store a variety of data by means of the processor 210. For example, the processor 210 may store in the memory 1120 a variety of image data obtained through the camera 230.

According to an embodiment of the disclosure, the memory 220 may be divided into at least one memory area. For example, the memory 220 may include a memory area for storing a plurality of image frames obtained through the camera 230 (e.g., the camera module 180 of FIG. 1). In addition, the memory 220 may include a memory area for storing an image with improved quality, based on at least one image frame among the plurality of image frames obtained through the camera 230. According to an embodiment of the disclosure, the memory area for storing the plurality of image frames obtained through the camera 230 may be configured as a buffer memory.

According to an embodiment of the disclosure, the processor 210 may delete some of the data stored in the memory 220. For example, the processor 210 may delete a plurality of image frames stored in the memory 220.

According to an embodiment of the disclosure, the display 240 may include a liquid crystal display (LCD), a light emitting diode (LED) display, or an organic light emitting diode (OLED) display. According to an embodiment of the disclosure, the display 240 may display a variety of content (e.g., text, image, video, icon, and/or symbol, or the like). For example, the display 240 may display at least one image among images obtained through the camera 230. In addition, the display 240 may display at least one image stored in the memory 220.

According to an embodiment of the disclosure, when shooting is in progress through the camera 230 of the electronic device 100, the display 240 may display a user interface related to the shooting. According to an embodiment of the disclosure, the display 240 may display a visual object (e.g., a shooting button) for a shooting command. The electronic device 100 may perform the shooting by receiving a user's touch input for the visual object displayed on the display 240. According to an embodiment of the disclosure, the processor 210 may obtain a shooting start command through the display 240. In addition, the processor 210 may obtain at least one shooting command subsequent to the shooting start command through the display 240. According to various embodiments of the disclosure, the processor 210 may obtain the shooting command by using various configurations of the electronic device 100 in addition to the display 240.

According to an embodiment of the disclosure, the processor 210 may obtain the shooting start command. According to an embodiment of the disclosure, the processor 210 may determine a shooting command obtained when a specified time has elapsed after a last obtained shooting command, as the shooting start command. For example, the processor 210 may use a timer to determine whether it is the shooting command obtained after the specified time has elapsed.

According to an embodiment of the disclosure, the processor 210 may obtain a plurality of image frames through the camera 230 in response to the shooting start command. According to an embodiment of the disclosure, the processor 210 may display at least one image frame among the plurality of image frames obtained through the camera 230 on the display 240 as a preview image. According to an embodiment of the disclosure, the processor 210 may store in the memory 220 the plurality of image frames obtained through the camera 230 in response to the shooting start command. For example, the processor 210 may store the plurality of image frames in a buffer memory area of the memory 220. According to an embodiment of the disclosure, the buffer memory area may correspond to an internal data structure. According to an embodiment of the disclosure, the processor 210 may store the plurality of image frames without compression.

According to an embodiment of the disclosure, the processor 210 may obtain a shooting command subsequent to the shooting start command. For example, the processor 210 may obtain a shooting command for continuous shooting. According to an embodiment of the disclosure, in response to the shooting command, the processor 210 may select a first number of image frames from among the plurality of image frames obtained before the shooting command. According to an embodiment of the disclosure, the processor 210 may select the first number of image frames to generate an image in response to the shooting command from among the plurality of image frames stored in the memory 220 before the shooting command.

According to an embodiment of the disclosure, the processor 210 may generate an image with improved quality in response to the shooting command. For example, the processor 210 may generate a first image by synthesizing the first number of image frames selected from among the plurality of image frames. According to an embodiment of the disclosure, the first image may be an image generated in response to the shooting command, and may be an image of which quality is improved through synthesis.

According to an embodiment of the disclosure, in the generating of the first image, the processor 210 may use the plurality of image frames obtained before the shooting command. Therefore, the processor 210 may reduce a time for obtaining image frames for generating the first image after the shooting command.

According to an embodiment of the disclosure, the processor 210 may determine a shooting environment. According to an embodiment of the disclosure, the processor 210 may determine the shooting environment by using the sensor 250 (e.g., an illuminance sensor). For example, the processor 210 may determine the shooting environment in response to the shooting start command and the shooting command. For example, the processor 210 may determine the shooting environment including an illuminance condition and/or a saturation condition.

According to an embodiment of the disclosure, the processor 210 may generate an image in response to the shooting command based on the shooting environment. For example, the processor 210 may not perform an operation of synthesizing an image, or may perform a single enhancement operation for improving noise or image saturation, based on the shooting environment.

According to an embodiment of the disclosure, the processor 210 may generate an image with improved quality by synthesizing at least some of the plurality of image frames stored in the memory 220, based on the shooting environment. According to an embodiment of the disclosure, the processor 210 may determine the number of image frames selected from among a plurality of image frames, based on the shooting environment. For example, the processor 210 may determine the first number, based on the shooting environment. For example, the processor 210 may determine the number of image frames to be synthesized from among the plurality of image frames according to the illuminance condition.

As described above, the electronic device 100 may include the camera 230, the memory 220, and the at least one processor 210 electrically coupled to the camera and the memory. The at least one processor may be configured to obtain a plurality of image frames through the camera, in response to a shooting start command, obtain a shooting command subsequent to the shooting start command, select a first number of image frames from among the plurality of image frames obtained before the shooting command, in response to the shooting command, and generate a first image synthesized based on the selected first number of image frames.

According to an embodiment of the disclosure, the at least one processor may determine a shooting environment, and may determine the first number, based on the shooting environment.

According to an embodiment of the disclosure, the electronic device may execute a timer in response to the shooting start command. The at least one processor may store the plurality of image frames in the memory in response to the shooting command subsequent to the shooting start command, in a state where the timer is running.

According to an embodiment of the disclosure, the at least one processor may initialize the timer in response to the shooting command.

According to an embodiment of the disclosure, the at least one processor may delete the plurality of image frames stored in the memory in response to the expiry of the timer.

According to an embodiment of the disclosure, the at least one processor may determine whether at least one image frame obtained before the shooting start command is stored in the memory, when the at least one image frame is not stored in the memory, select a second number of image frames from among the plurality of image frames obtained after the shooting start command, and generate a second image synthesized based on the selected second number of image frames.

According to an embodiment of the disclosure, when the first number of image frames are selected, the at least one processor may select the image frames in a reverse order by which each of the plurality of image frames is obtained.

According to an embodiment of the disclosure, the at least one processor may select at least one image frame from among the plurality of image frames obtained before the shooting command in response to the shooting command, select at least one image frame from among the image frames obtained after the shooting command, and generate a third image synthesized based on the selected image frames.

According to an embodiment of the disclosure, the at least one processor may select a criterion image and at least one reference image from among the plurality of image frames, and generate an image with improved quality by synthesizing the criterion image and the at least one reference image.

According to an embodiment of the disclosure, the at least one processor may encode the generated first image and store the encoded first image in the memory.

As described above, a method of operating the electronic device 100 may include obtaining a plurality of image frames through the camera 230 included in the electronic device, in response to a shooting start command, obtaining a shooting command subsequent to the shooting start command, selecting a first number of image frames from among the plurality of image frames obtained before the shooting command, in response to the shooting command, and generating a first image synthesized based on the selected first number of image frames.

According to an embodiment of the disclosure, the method may further include determining a shooting environment in response to the shooting command. The first number may be determined based on the shooting environment.

According to an embodiment of the disclosure, the method of operating the electronic device may further include executing a timer included in the electronic device in response to the shooting start command, and storing the plurality of image frames in the memory of the electronic device in response to the shooting command subsequent to the shooting start command, in a state where the timer is running.

According to an embodiment of the disclosure, the method of operating the electronic device may further include initializing the timer in response to the shooting command.

According to an embodiment of the disclosure, the method of operating the electronic device may further include deleting the plurality of image frames stored in the memory in response to the expiry of the timer.

According to an embodiment of the disclosure, the method of operating the electronic device may further include determining whether at least one image frame obtained before the shooting start command is stored in the memory, when the at least one image frame is not stored in the memory, selecting a second number of image frames from among the plurality of image frames obtained after the shooting start command, and generating a second image synthesized based on the selected second number of image frames.

According to an embodiment of the disclosure, the selecting of the first number of image frames may be selecting of the image frames in a reverse order by which each of the plurality of image frames is obtained.

According to an embodiment of the disclosure, the method of operating the electronic device may further include selecting at least one image frame from among the plurality of image frames obtained before the shooting command, based on the shooting environment, selecting at least one image frame from among the image frames obtained after the shooting command, and generating a third image synthesized based on the selected image frames.

According to an embodiment of the disclosure, the method of operating the electronic device may further include encoding the generated first image, and storing the encoded first image in the memory.

According to an embodiment of the disclosure, a non-transitory recording medium (e.g., the memory 220 of FIG. 2) storing computer readable instructions may be configured to perform obtaining a plurality of image frames through a camera, in response to a shooting start command, obtaining a shooting command subsequent to the shooting start command, select a first number of image frames from among the plurality of image frames obtained before the shooting command, in response to the shooting command, and generating a first image synthesized based on the selected first number of image frames.

Figure 3:
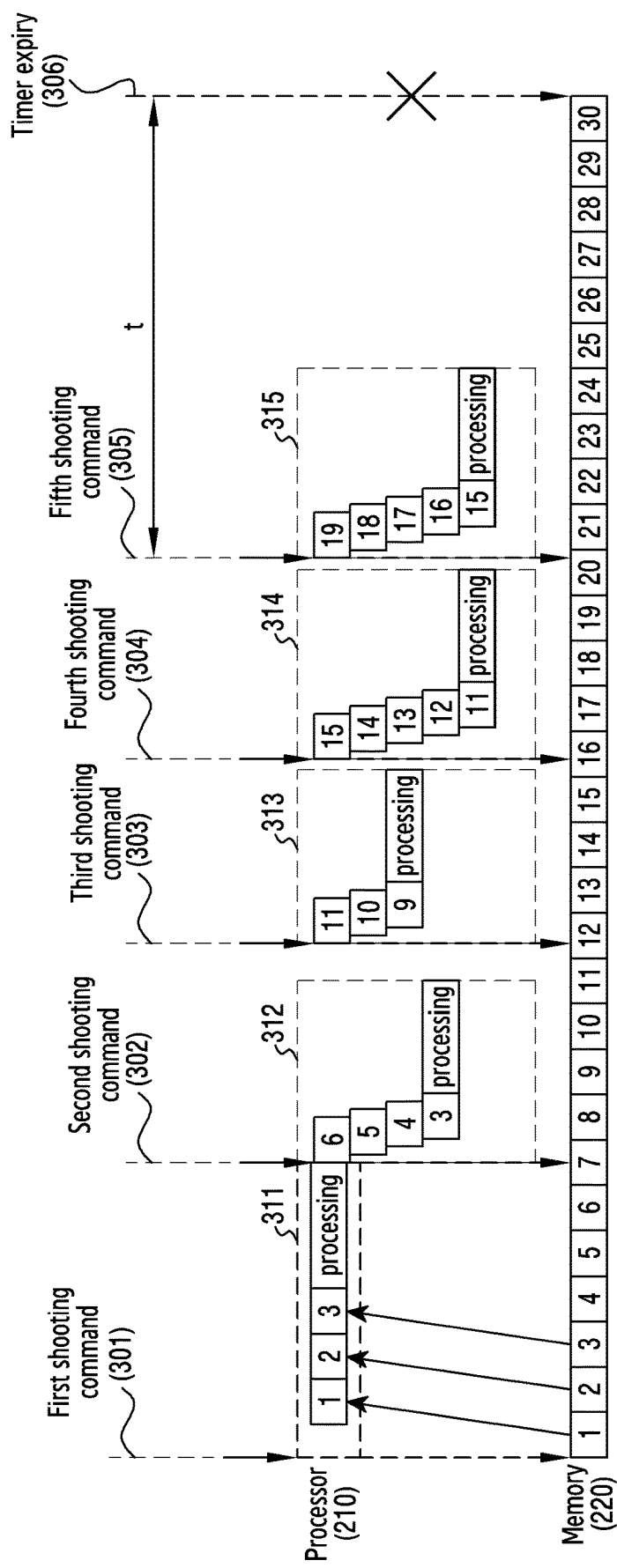
FIG. 3 is drawing for illustrating a shooting operation of an electronic device according to an embodiment of the disclosure.

FIG. 3 is drawing for illustrating a shooting operation of an electronic device according to an embodiment of the disclosure.

Referring to FIG. 3, there is provided the memory 220 for storing a plurality of image frames in response to obtaining of a shooting start command from a user and the processor 210 for performing an operation for image quality improvement.

According to an embodiment of the disclosure, the processor 210 may obtain a first shooting command 301. According to an embodiment of the disclosure, the first shooting command 301 may be expressed as a shooting start command. In an embodiment of the disclosure, the processor 210 may obtain second to fifth shooting commands 302 to 305 subsequent to the first shooting command 301. The first to fifth shooting commands 301 to 305 may be expressed as continuous shooting.

According to an embodiment of the disclosure, the processor 210 may use a timer when performing a shooting operation. For example, the processor 210 may execute the timer in response to the obtaining of the first shooting command 301. Therefore, the first shooting command 301 may indicate a shooting command obtained when the timer is not running. According to an embodiment of the disclosure, when the timer is running, the processor 210 may maintain an operation of storing in the memory 220 a plurality of image frames obtained from the camera 230. Therefore, when the timer is running, the processor 210 may continuously store in the memory 220 the plurality of image frames obtained from the camera 230. According to an embodiment of the disclosure, an area of the memory 220 in which the plurality of image frames are stored may be a buffer memory area.

According to an embodiment of the disclosure, the processor 210 may obtain a plurality of image frames through the camera 230 in response to the obtaining of the first shooting command 301. According to an embodiment of the disclosure, the processor 210 may store in the memory 220 a plurality of image frames obtained through the camera 230 in response to the first shooting command 301. For example, the processor 210 may store in the memory 220 a plurality of image frames (e.g., 1st to 30th frames) obtained after the first shooting command 301 until a timer expires (see 306). According to an embodiment of the disclosure, the processor 210 may provide control to store a plurality of image frames by a size determined depending on capacity of the memory 220. The plurality of image frames may be maintained in the memory 220 for a certain period of time even after a synthesized image is generated.

According to an embodiment of the disclosure, the processor 210 may execute the timer, in response to the first shooting command 301 which is a shooting start command. According to an embodiment of the disclosure, the timer may be a timer preset for continuous shooting. In addition, the processor 210 may obtain at least one image frame through the camera 230 in response to the first shooing command 301. According to an embodiment of the disclosure, when the shooting command is the shooting start command, the processor 210 may generate an image with improved quality by synthesizing a plurality of image frames obtained after the shooting start command. For example, the processor 210 may obtain the $1^{st}$ to $3^{rd}$ image frames through the camera 230 after the first shooting command 301, in response to the first shooting command 301.

According to an embodiment of the disclosure, the processor 210 may collect and synthesize the obtained $1^{st}$ to $3^{rd}$ image frames. According to an embodiment of the disclosure, the processor 210 may perform an operation 311 of collecting and synthesizing the $1^{st}$ to $3^{rd}$ image frames, in response to the first shooting command 301. Therefore, a first image with improved quality based on the $1^{st}$ to $3^{rd}$ image frames may be generated in response to the first shooting command 301. According to an embodiment of the disclosure, the processor 210 may store the generated first image in the memory 220. For example, the processor 210 may store the generated first image in a memory area distinct from a buffer memory area in which a plurality of image frames are stored.

According to an embodiment of the disclosure, the processor 210 may obtain the second shooting command 302 subsequent to the first shooting command 301. According to an embodiment of the disclosure, the second shooting command 302 may be a shooting command subsequent to the first shooting command 301 corresponding to the shooting start command. According to an embodiment of the disclosure, the processor 210 may initialize the timer in response to the second shooting command 302. For example, when the timer is set to 5 seconds, the timer may start again from 5 seconds in response to the second shooting command 302.

According to an embodiment of the disclosure, in response to the second shooting command 302, the processor 210 may select a first number of image frames from among a plurality of image frames obtained before the second shooting command 302. For example, the processor 210 may select the $3^{rd}$ to $6^{th}$ image frames from among the plurality of image frames stored in the memory 220. According to an embodiment of the disclosure, in response to the second shooting command 302, the processor 210 may perform an operation 312 of selecting and synthesizing the $3^{rd}$ to $6^{th}$ image frames obtained before the second shooting command 302. The processor 210 according to an embodiment of the disclosure may select and synthesize the first number of image frames in a reverse order from among the plurality of image frames stored in the memory 220 before the second shooting command 302. For example, the processor 210 may select the $3^{rd}$ to $6^{th}$ image frames in a reverse order in a last in first out (LIFO) manner among a plurality of image frames previously obtained based on the second shooting command 302. In addition, the processor 210 may generate a second image by synthesizing the $3^{rd}$ to $6^{th}$ image frames. According to an embodiment of the disclosure, the processor 210 may store the generated second image in the memory 220. For example, the processor 210 may store the generated second image in a memory area distinct from a buffer memory area in which a plurality of image frames are stored.

According to an embodiment of the disclosure, the processor 210 may determine a shooting environment in response to the second shooting command 302. The processor 210 may select some of the plurality of image frames stored in the memory 220, based on the determined shooting environment. For example, the processor 210 may determine the number of image frames to be synthesized, based on the determined shooting environment.

According to an embodiment of the disclosure, the processor 210 may obtain the third shooting command 303 subsequent to the second following the second shooting command 302. The processor 210 according to an embodiment of the disclosure may perform an operation similar to an operation which responds to the second shooting command 302 in response to the third shooting command 303. For example, the processor 210 may initialize the timer in response to the third shooting command 303. In addition, in response to the third shooting command 303, the processor 210 may select some of the plurality of image frames obtained before the third shooting command 303. For example, the processor 210 may select three image frames, based on the shooting environment. The processor 210 may generate a third image by performing an operation 313 of selecting and synthesizing the $9^{th}$ to $11^{th}$ image frames.

According to an embodiment of the disclosure, in response to the fourth shooting command 304, the processor 210 may perform an operation similar to the operation performed in response to the second shooting command 302 and/or the third shooting command 303. For example, the processor 210 may initialize the timer, in response to the fourth shooting command 304. In addition, in response to the fourth shooting command 304, the processor 210 may determine a shooting environment, and may select the $11^{th}$ to $15^{th}$ image frames obtained before the fourth shooting command 304. The processor 210 according to an embodiment of the disclosure may generate a fourth image by performing an operation 314 of selecting and synthesizing the $11^{th}$ to $15^{th}$ image frames in a LIFO manner from among the plurality of image frames obtained before the fourth shooting command 304.

According to an embodiment of the disclosure, in response to the fifth shooting command 305, the processor 210 may perform an operation similar to the operation performed in response to the second shooting command 302 to the fourth shooting command 304. For example, the processor 210 may initialize the timer in response to the fifth shooting command 305. In addition, in response to the fifth shooting command 305, the processor 210 may determine a shooting environment and select the $15^{th}$ to $19^{th}$ image frames obtained before the fifth shooting command 305. The processor 210 according to an embodiment of the disclosure may generate a fifth image by performing an operation 315 of selecting and synthesizing the $15^{th}$ to $19^{th}$ image frames in a LIFO manner from among the plurality of image frames obtained before the fifth shooting command 305.

According to an embodiment of the disclosure, the processor 210 may end the timer (see 306) when there is no shooting command subsequent to the fifth shooting command 305 for a specified time t. According to an embodiment of the disclosure, the processor 210 may initialize the timer whenever a shooting command is obtained, and when there is no shooting command for the specified time t, may end the timer (see 306) by determining that continuous shooting has ended. For example, where there is no shooting command for 5 seconds after the fifth shooting command 305 which is a last shooting command, the processor 210 may determine that the continuous shooting has ended.

According to an embodiment of the disclosure, when the timer expires, the processor 210 may stop the operation of storing the plurality of image frames obtained through the camera 230 continuously after the first shooting command 301. According to an embodiment of the disclosure, in response to the timer expiry (see 306), the processor 210 may delete the plurality of image frames (e.g., the $1^{st}$ to $30^{th}$ image frames) stored in the memory 220. According to an embodiment of the disclosure, the deleting of the plurality of image frames (e.g., the $1^{st}$ to $30^{th}$ image frames) stored in the memory 220 may be interpreted as releasing the plurality of image frames stored in the memory 220.

According to an embodiment of the disclosure, the processor 210 may maintain the plurality of image frames stored in the memory 220 before the timer expiry (see 306). Therefore, when generating a synthesized image, the processor 210 may synthesize some image frames in an overlapping manner from among the plurality of image frames stored in the memory 220. For example, since the processor 210 has the $11^{th}$ image frame stored in the memory 220 until the timer expiry (see 306), the third image and the fourth image may be generated using the $11^{th}$ image frame in response to the third shooting command 303 and the fourth shooting command 304. In addition, since the processor 210 has the $15^{th}$ image frame stored in the memory 220 until the timer expiry (see 306), the fourth image and the fifth image may be generated using the $15^{th}$ image frame in response to the fourth shooting command 304 and the fifth shooting command 305.

According to an embodiment of the disclosure, the processor 210 may determine the number of image frames to be synthesized based on the shooting environment. For example, in case of a low illuminance shooting environment, the processor 210 may synthesize and generate more image frames than in a high illuminance shooting environment. For example, the processor 210 may generate the third image by synthesizing three image frames (the $9^{th}$ to $11^{th}$ image frames) in response to the third shooting command 303, and may generate the fifth image by synthesizing five image frames (the $15^{th}$ to $19^{th}$ image frames) in response to the fifth shooting command 305.

Figure 4:
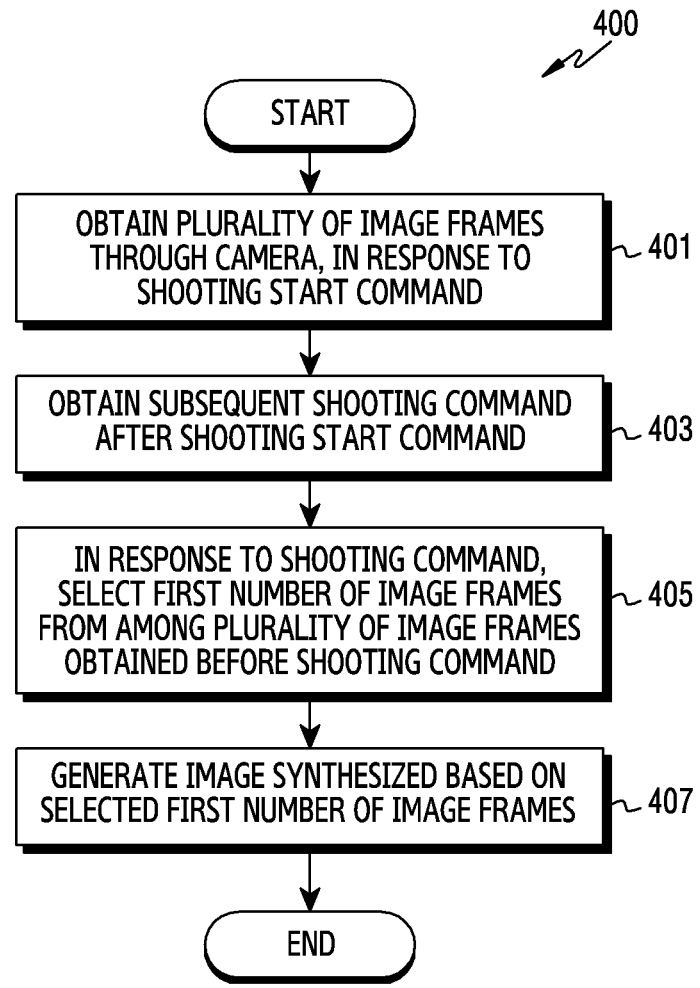
FIG. 4 is a flowchart illustrating a continuous shooting operation of an electronic device according to an embodiment of the disclosure.

FIG. 4 is a flowchart 400 illustrating a continuous shooting operation of an electronic device according to an embodiment of the disclosure.

Referring to FIG. 4, in operation 401, the processor 210 may obtain a plurality of image frames through the camera 230 in response to a shooting start command. According to an embodiment of the disclosure, the processor 210 may store in the memory 220 a plurality of image frames obtained in response to the shooting start command. According to an embodiment of the disclosure, the processor 210 may execute a timer in response to the shooting start command. According to an embodiment of the disclosure, the processor 210 may maintain an operation of storing the plurality of image frames obtained through the camera 230 during a specified time (e.g., until the timer expires) in response to the shooting start command.

According to an embodiment of the disclosure, the processor 210 may determine whether a timer is running in response to the obtaining of the shooting start command and, if the timer is not running, may determine the obtained shooting command as the shooting start command.

According to an embodiment of the disclosure, in operation 403, the processor 210 may obtain a subsequent shooting command after the shooting start command. According to an embodiment of the disclosure, the processor 210 may initialize the timer in response to the obtaining of the shooting command. For example, the processor 210 may initialize the timer which has been running after the shooting start command upon obtaining of the subsequent shooting command.

According to an embodiment of the disclosure, in operation 405, in response to the shooting command, the processor 210 may select a first number of image frames from among a plurality of image frames obtained before the shooting command. For example, the processor 210 may select the first number of image frames from among a plurality of image frames stored in the memory 220 before the shooting command is obtained after the shooting start command. In an embodiment of the disclosure, the processor 210 may determine the first number, based on a shooting environment. For example, the first number may be greater in a low illuminance shooting environment, compared to a high illuminance shooting environment.

In operation 407, the processor 210 according to an embodiment of the disclosure may generate an image synthesized based on the selected first number of image frames. According to an embodiment of the disclosure, the processor 210 may determine the first number of image frames as a target image in response to the shooting command, and may generate an image with improved quality by synthesizing the target images.

According to an embodiment of the disclosure, the electronic device 100 synthesizes the first number of image frames among the plurality of image frames obtained before the shooting command to generate an image, thereby reducing a time required to obtain the image frame after the shooting command.

Figure 5:
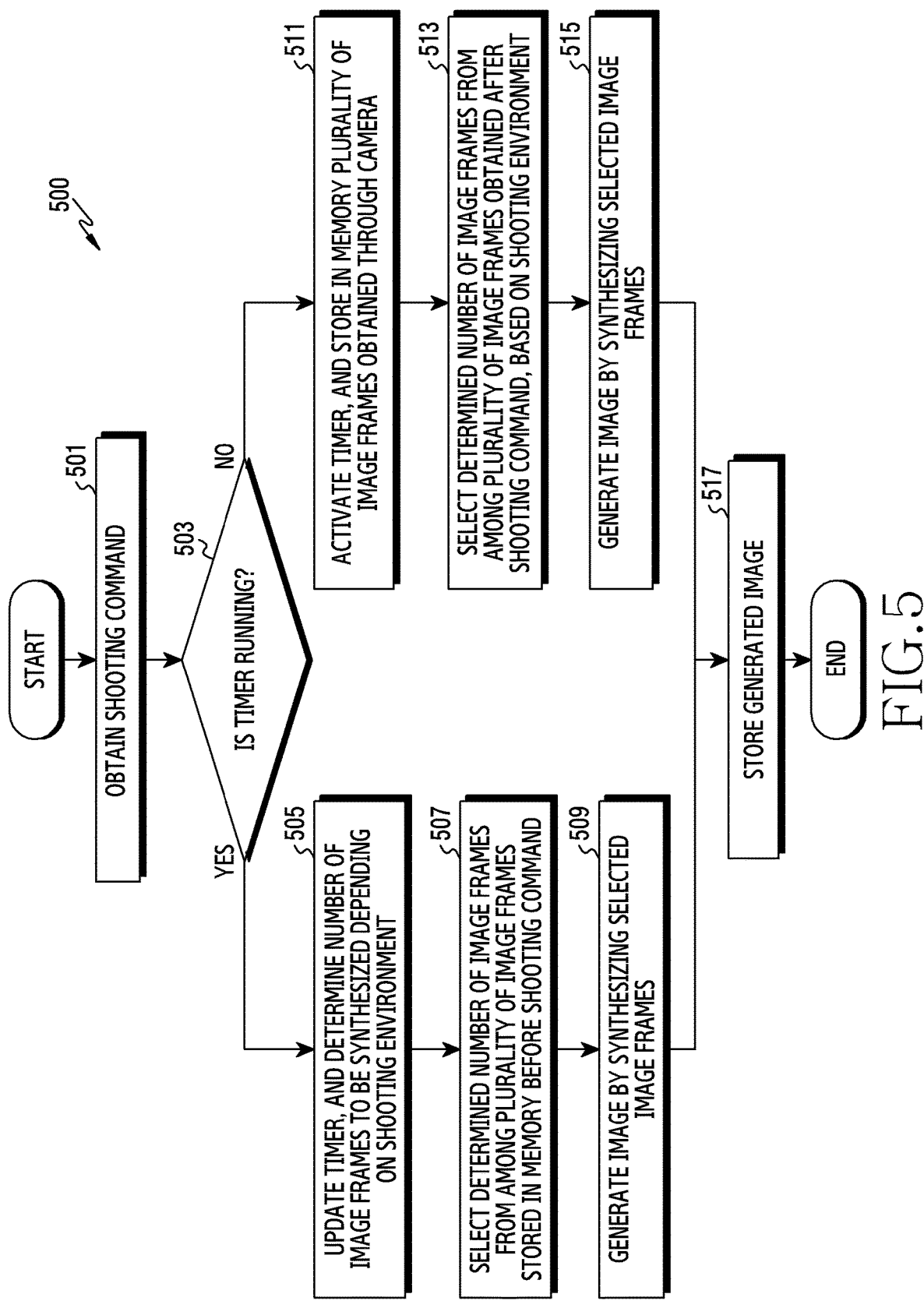
FIG. 5 is a flowchart illustrating a continuous shooting operation based on whether a timer runs in an electronic device according to an embodiment of the disclosure.

FIG. 5 is a flowchart 500 illustrating a continuous shooting operation based on whether a timer runs in an electronic device according to an embodiment of the disclosure.

Referring to FIG. 5, in operation 501, the processor 210 may obtain a shooting command. According to an embodiment of the disclosure, the processor 210 may obtain the shooting command through the display 240. For example, the processor 210 may obtain the shooting command when a user touches a visual object (e.g., a shooting button) displayed on the display 240. According to various embodiments of the disclosure, the shooting command may be obtained in various manners without limitation. According to an embodiment of the disclosure, the processor 210 may display a preview image through the display 240 in response to the obtaining of the shooting command. For example, the processor 210 may display the preview image, based on at least some of the plurality of image frames obtained through the camera 230.

According to an embodiment of the disclosure, in operation 503, the processor 210 may determine whether the timer is running. According to an embodiment of the disclosure, in operation 503, the processor 210 may execute and end the timer through instructions stored in the memory 220. Alternatively, the electronic device 100 may include a timer configured in hardware. The timer performing the same function without being limited to the example disclosed in the disclosure may be configured in software or hardware.

According to an embodiment of the disclosure, in operation 505, the processor 210 may update the timer when the timer is running ('yes' in operation 503). In addition, in operation 505, the processor 210 may determine the number of image frames to be synthesized according to a shooting environment. According to an embodiment of the disclosure, the processor 210 may determine the shooting environment in response to the obtaining of the shooting command, and may determine the number of image frames to be synthesized according to the determined shooting environment.

According to an embodiment of the disclosure, in operation 507, the processor 210 may select a determined number of image frames from among the plurality of image frames stored in the memory 220 before the shooting command. For example, when the number of image frames to be synthesized is determined to be 5 in operation 505, the processor 210 may select five image frames from among the plurality of image frames stored in the memory 220. According to an embodiment of the disclosure, when selecting an image frame, the processor 210 may select the determined number of image frames stored in the memory 220 in a LIFO manner. For example, the image frames may be selected from an image frame obtained at a time close to a time of obtaining the shooting command.

According to an embodiment of the disclosure, in operation 509, the processor 210 may generate an image by synthesizing the selected image frames. The processor 210 may determine the selected image frames as a target image frame in response to the shooting command, and may generate an image by synthesizing the selected image frames. Therefore, in response to the shooting command, the processor 210 may generate an image with improved quality, based on image frames selected from among the plurality of image frames obtained before the shooting command.

According to an embodiment of the disclosure, when the timer is not running ('no' in operation 503), in operation 511, the processor 210 may activate the timer. In addition, the processor 210 may store in the memory 220 the plurality of image frames obtained through the camera 230. According to an embodiment of the disclosure, the processor 210 may obtain the shooting command, and when the timer is not running, may determine the shooting command as the shooting start command. Therefore, operations based on the shooting start command may be similarly performed as described above.

According to an embodiment of the disclosure, in operation 513, the processor 210 may select a determined number of image frames from among the plurality of image frames obtained after the shooting command, based on the shooting environment. According to an embodiment of the disclosure, the processor 210 may determine the number of image frames to be synthesized in response to the shooting command, based on the shooting environment. The processor 210 may select the determined number of image frames from among the plurality of image frames obtained after the shooting command. For example, when the timer is not running, the processor 210 may select a second number of image frames among from the plurality of image frames obtained after the shooting command.

According to an embodiment of the disclosure, in operation 515, the processor 210 may generate an image by synthesizing the selected image frames. For example, the processor 210 may select the determined number of image frames from among the plurality of image frames obtained after the shooting command, and may synthesize the selected image frames. For example, the processor 210 may select the second number of image frames, and may generate a second image synthesized based on the selected second number of image frames. Therefore, in response to the shooting command, the processor 210 may generate an image with improved quality, based on the image frames determined from among the plurality of image frames obtained after the shooing command.

According to an embodiment of the disclosure, in operation 517, the processor 210 may store the generated image. According to an embodiment of the disclosure, the processor 210 may encode the image generated through the synthesis, and may store the encoded image in the memory 220.

Figure 6:
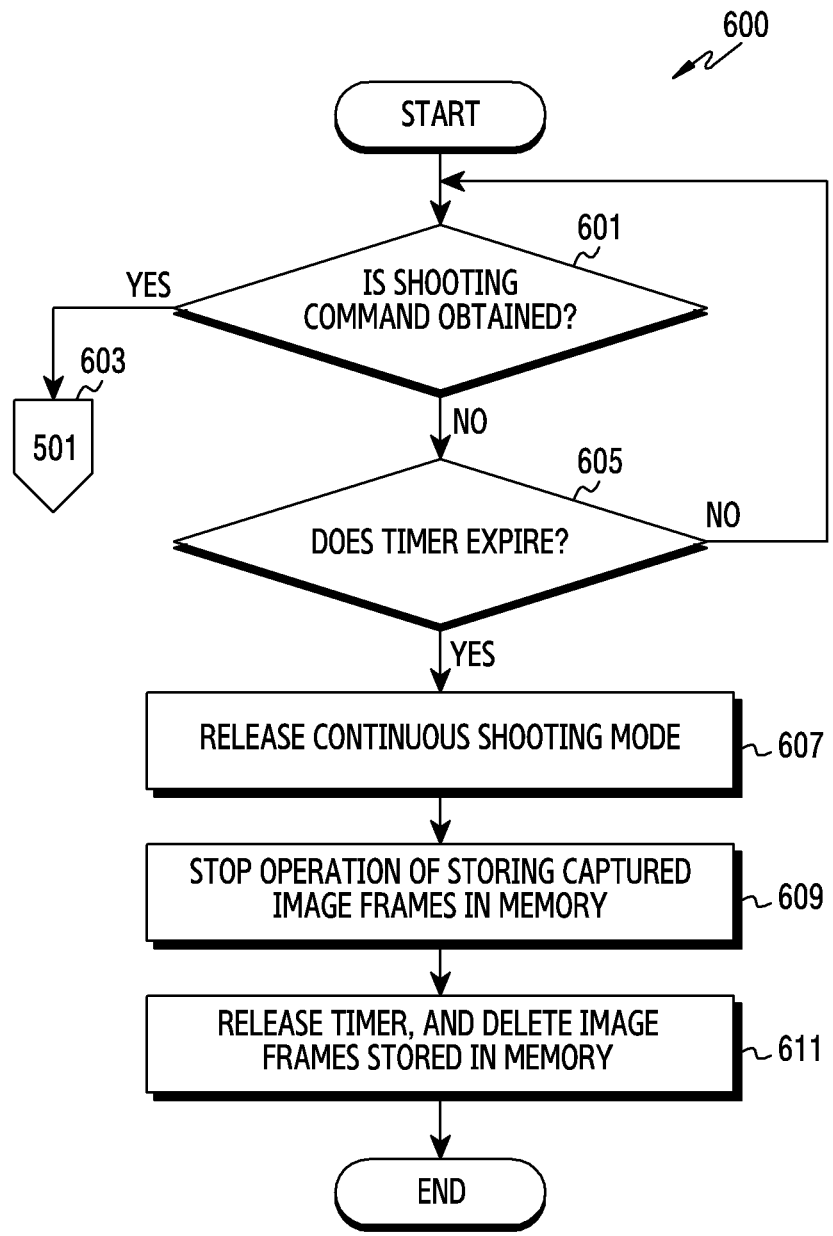
FIG. 6 is a flowchart illustrating an operation in which an electronic device releases a continuous shooting mode according to an embodiment of the disclosure.

FIG. 6 is a flowchart 600 illustrating an operation in which an electronic device releases a continuous shooting mode according to an embodiment of the disclosure.

Referring to FIG. 6, in operation 601, the processor 210 may determine whether a shooting command is obtained. For example, the processor 210 may obtain the shooting command from a user of the electronic device 100, and may identify whether the shooting command is obtained.

According to an embodiment of the disclosure, when the shooting command is obtained ('yes' in operation 601), the processor 201 may perform the operation 503 described with respect to FIG. 5 according to operation 603. Therefore, when the shooting command is obtained, the processor 210 may perform the operations 503 to 517.

According to an embodiment of the disclosure, when the shooting command is not obtained ('no' in operation 601), in operation 605, the processor 210 may determine whether a timer expires. According to an embodiment of the disclosure, when the timer does not expire ('no' in operation 605), the processor 210 may perform the operation 601.

According to an embodiment of the disclosure, when the timer expires ('yes' in operation 605), in operation 607, the processor 210 may release the continuous shooting mode. For example, the processor 210 may determine the continuous shooting command input from a user of the electronic device 100 as continuous shooting. When the timer expires, the processor 210 may determine that an operation of inputting the continuous shooting command from the user is interrupted. According to an embodiment of the disclosure, the processor 210 may execute a timer in response to a shooting start command, and may update the timer upon obtaining of a shooting command subsequent to the shooting start command. According to an embodiment of the disclosure, when the timer is running, the processor 210 may determine that the continuous shooting command is input from the user. Therefore, when the shooting command is not obtained for a specified time and thus the timer expires, the processor 210 may release the continuous shooing mode.

According to an embodiment of the disclosure, in operation 609, the processor 210 may stop an operation in which image frames captured through the camera 230 are stored in the memory 220. According to an embodiment of the disclosure, when the timer is running, the processor 210 may store in the memory 220 the plurality of image frames obtained through the camera 230 while the timer is running. Thereafter, when the timer expires, the processor 210 may stop the operation of storing in the memory the image frames captured through the camera 230.

According to an embodiment of the disclosure, in operation 611, the processor 210 may release the timer. In addition, after the timer is executed, the processor 210 may delete the plurality of image frames stored in the memory 220 during the timer is running. The processor 210 according to an embodiment of the disclosure may delete the plurality of image frames obtained through the camera 230 from the memory 220, based on the continuous shooting mode.

Figure 7:
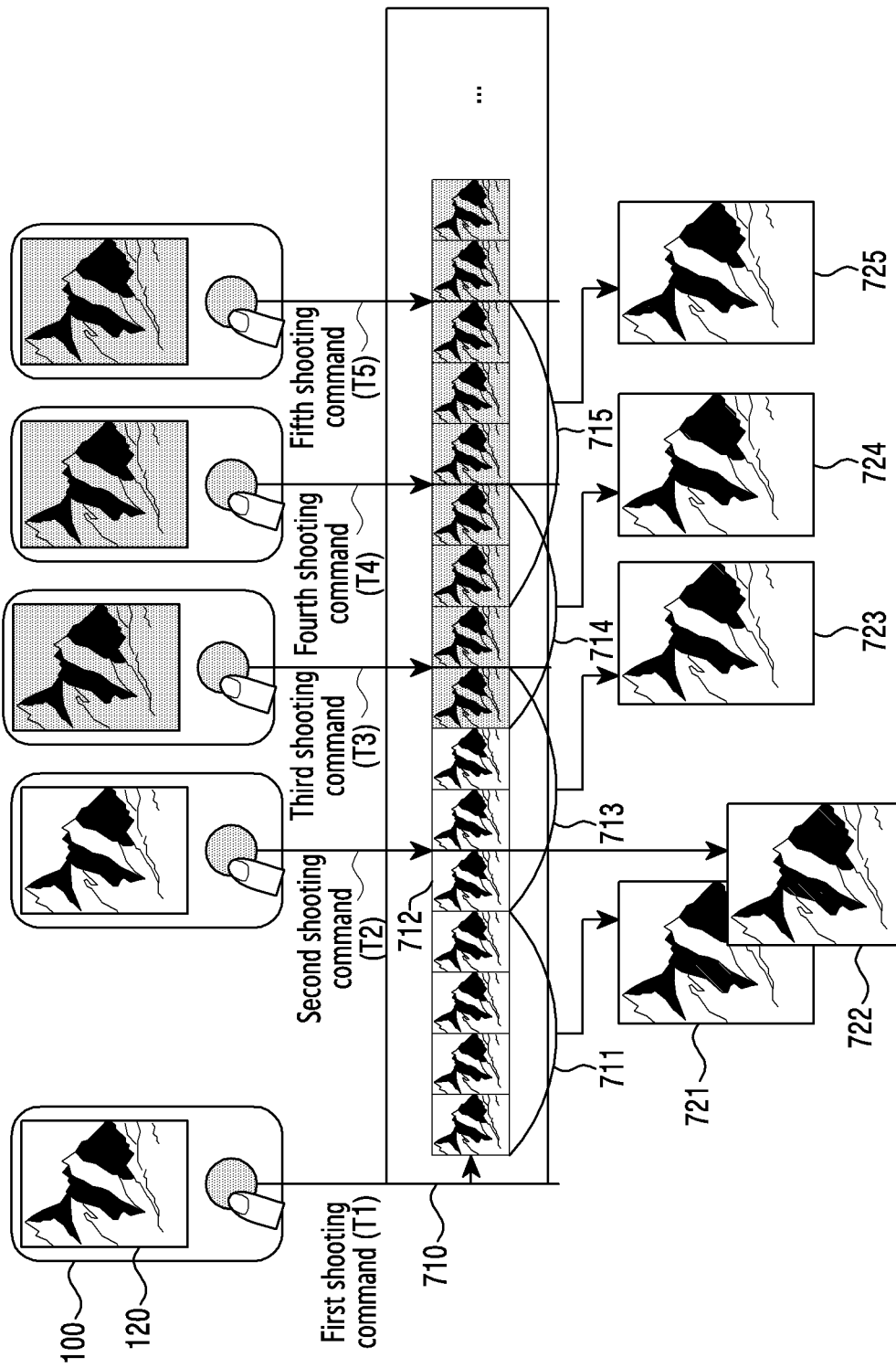
FIG. 7 is a diagram illustrating an operation in which an electronic device synthesizes an image upon obtaining of a shooting command according to an embodiment of the disclosure.

FIG. 7 is a diagram illustrating an operation in which an electronic device synthesizes an image upon obtaining of a shooting command according to an embodiment of the disclosure.

Referring to FIG. 7, it is shown an image 710 displayed on the display 110 (e.g., the display 240 of FIG. 2) of the electronic device 100, based on the shooting command. According to an embodiment of the disclosure, in response to the shooting command, the processor 210 may display a preview image by using the display 110, based on an image frame obtained through the camera 230.

According to an embodiment of the disclosure, the processor 210 may obtain a first shooting command T1 corresponding to a shooting start command. For example, the processor 210 may obtain the first shooting command T1, and may determine whether a timer is running, which indicates whether it is continuous shooting. When the timer is not running, the processor 210 may identify the first shooting command T1 as the shooting start command, and may set a shooting mode to a continuous shooting mode. In addition, the processor 210 may activate the timer in response to the first shooting command T1.

According to an embodiment of the disclosure, the processor 210 may store in the memory 220 a plurality of image frames obtained through the camera 230 in response to the first shooting command T1. According to an embodiment of the disclosure, the processor 210 may store the plurality of image frames in a memory area (e.g., a buffer memory) specified for continuous shooting.

According to an embodiment of the disclosure, in response to the first shooting command T1, the processor 210 may select a first image frame set 711 from among a plurality of image frames obtained after the first shooting command T1, and may generate a first image 721 by synthesizing the first image frame set 711.

According to an embodiment of the disclosure, the processor 210 may determine the shooting environment upon obtaining of the shooting command. According to an embodiment of the disclosure, the processor 210 may determine the shooting environment, and may determine a method of generating an image with improved quality according to the shooting command. For example, when illuminance is low due to a dark shooting environment, the processor 210 may generate an image by synthesizing a plurality of image frames. According to an embodiment of the disclosure, the processor 210 may generate an image with improved quality by synthesizing more image frames when the illuminance is low, compared to a case where the illuminance is high.

As another example, the processor 210 may determine the method of generating the image with improved quality, based on whether it is a saturation condition. For example, when it is the saturation condition and the illuminance is normal, the processor 210 may generate the image with improved quality by performing saturation improvement on a single image frame.

According to an embodiment of the disclosure, the shooting environment may be determined in response to a second shooting command T2. For example, the processor 210 may determine the shooting environment in response to the second shooting command T2, and may determine whether the shooting environment corresponds to the normal illuminance and the saturation condition. According to an embodiment of the disclosure, in response to the second shooting command T2, the processor 210 may select a single image frame 712 from among a plurality of image frames obtained before the second shooting command T2, and may perform a saturation improvement operation on the single image frame 712. According to an embodiment of the disclosure, the processor 210 may perform the saturation improvement operation to generate a second image 722 in response to the second shooting command T2.

According to an embodiment of the disclosure, the processor 210 may determine the shooting environment in response to a third shooting command T3. The processor 210 may determine the number of image frames to be synthesized as a result of the determination. According to an embodiment of the disclosure, in response to the third shooting command T3, the processor 210 may select a third image frame set 713 including four image frames. According to an embodiment of the disclosure, the processor 210 may select the third image frame set 713 in a LIFO manner from among a plurality of image frames obtained after the first shooting command T1 and before the third shooting command T3. According to an embodiment of the disclosure, the processor 210 may generate a third image 723 by synthesizing image frames included in the third image frame set 713.

According to an embodiment of the disclosure, in response to the shooting command, the processor 210 may select a criterion image and at least one reference image from among the plurality of image frames stored in the memory 220. In addition, the processor 210 may generate an image by synthesizing the criterion image and the at least one reference image. For example, the processor 210 may select the criterion image and the at least one reference image from among image frames included in the third image frame set 713. In addition, the processor 210 may generate the third image 723 by synthesizing the selected criterion image and at least one reference image.

According to an embodiment of the disclosure, the processor 210 may obtain a fourth shooting command T4 and a fifth shooting command T5. According to an embodiment of the disclosure, upon obtaining of the fourth shooting command T4 and the fifth shooting command T5, the processor 210 may perform operations similar to operations performed when the third shooting command T3 is obtained. For example, in response to the fourth shooting command T4 and the fifth shooting command T5, the processor 210 may determine respective shooting environments for the fourth shooting command T4 and the fifth shooting command T5. For example, the processor 210 may determine that illuminance is low since the shooting environment for the fifth shooting command T5 is lower than the shooting environment for the fourth shooting command T4.

According to an embodiment of the disclosure, in response to the fourth shooting command T4, the processor 210 may generate a fourth image 724 by selecting and synthesizing a fourth image frame set 714 from among a plurality of image frames obtained before the fourth shooting command T4.

According to an embodiment of the disclosure, in response to the fifth shooting command T5, the processor 210 may generate a fifth image 725 by selecting and synthesizing a fifth image frame set 715 from among a plurality of image frames obtained before the fifth shooting command T5. According to an embodiment of the disclosure, the number of image frames included in an image frame set may be determined depending on the shooting environment. For example, the processor 210 may select the fourth image frame set 714 including four image frames in response to the fourth shooting command T4, and may select the fifth image frame set 715 including five image frames in response to the fifth shooting command T5.

According to an embodiment of the disclosure, the processor 210 may use at least one image obtained after the shooting command, when it is unable to generate a synthesized image using only a plurality of image frames obtained before the shooting command according to the shooting environment. For example, in response to the shooting command, the processor 210 may select at least one image frame from among a plurality of image frames obtained before the shooting command, and may select at least one image frame from among image frames obtained after the shooting command. In addition, the processor 210 may generate an image synthesized based on the selected image frames. For example, the processor 210 may generate an image synthesized based on not only an image frame obtained before the shooting command but also an image frame obtained after the shooting command.

According to an embodiment of the disclosure, the processor 210 may store the generated first to fifth images 721 to 725 in the memory 220. In addition, the processor 210 may display the generated first to fifth images 721 to 725 through the display 110.

Figure 8:
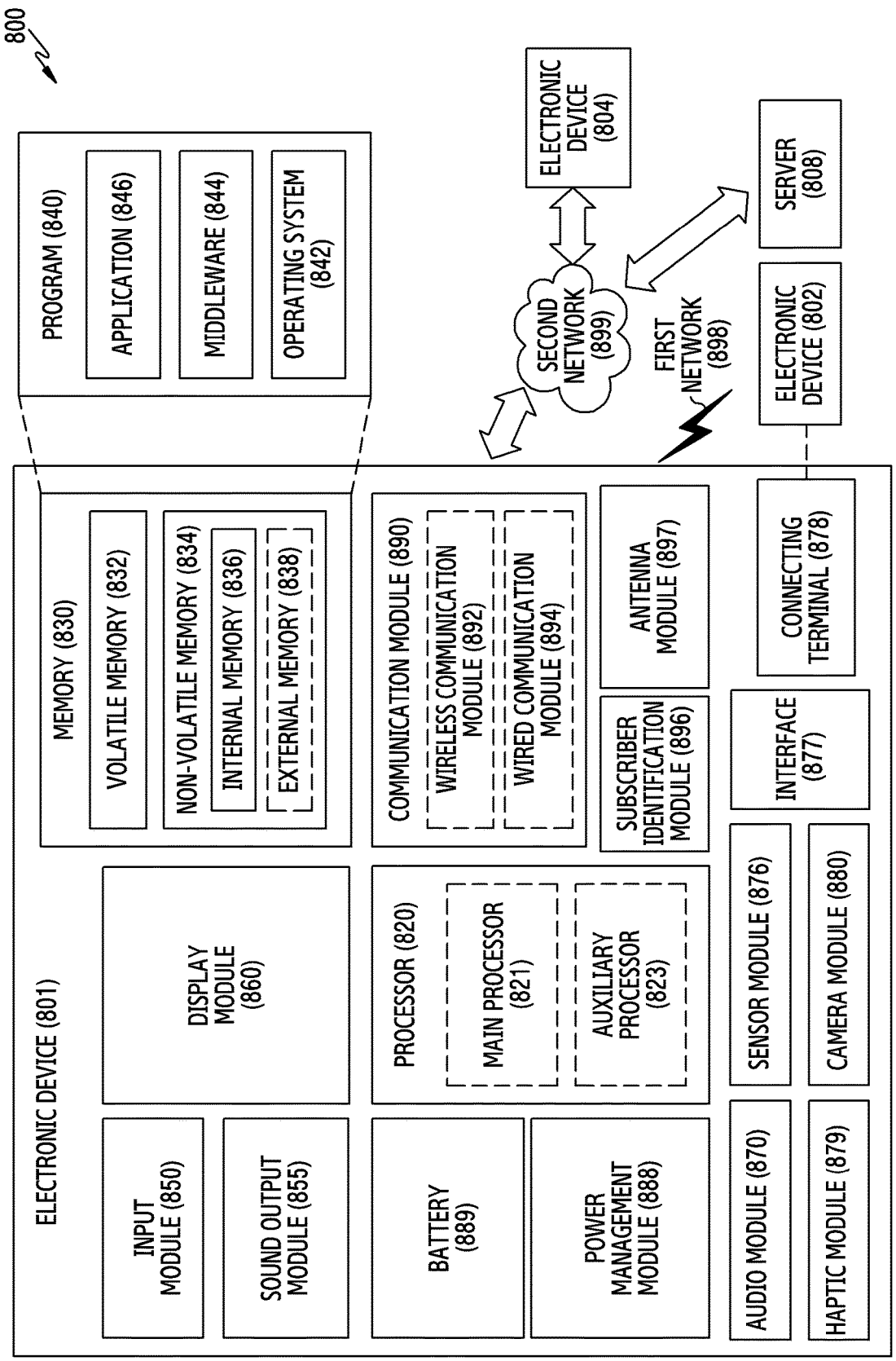
FIG. 8 is a block diagram of an electronic device in a network environment according to various embodiments.

FIG. 8 is a block diagram illustrating an electronic device 801 in a network environment 800 according to various embodiments.

Referring to FIG. 8, the electronic device 801 in the network environment 800 may communicate with an electronic device 802 via a first network 898 (e.g., a short-range wireless communication network), or at least one of an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input module 850, a sound output module 855, a display module 860, an audio module 870, a sensor module 876, an interface 877, a connecting terminal 878, a haptic module 879, a camera module 880, a power management module 888, a battery 889, a communication module 890, a subscriber identification module (SIM) 896, or an antenna module 897. In some embodiments, at least one of the components (e.g., the connecting terminal 878) may be omitted from the electronic device 801, or one or more other components may be added in the electronic device 801. In some embodiments, some of the components (e.g., the sensor module 876, the camera module 880, or the antenna module 897) may be implemented as a single component (e.g., the display module 860).

The processor 820 may execute, for example, software (e.g., a program 840) to control at least one other component (e.g., a hardware or software component) of the electronic device 801 coupled with the processor 820, and may perform various data processing or computation. According to one embodiment, as at least part of the data processing or computation, the processor 820 may store a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), or an auxiliary processor 823 (e.g., a graphics processing unit (GPU), a neural processing unit (NPU), an image signal processor (ISP), a sensor hub processor, or a communication processor (CP)) that is operable independently from, or in conjunction with, the main processor 821. For example, when the electronic device 801 includes the main processor 821 and the auxiliary processor 823, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display module 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823. According to an embodiment, the auxiliary processor 823 (e.g., the neural processing unit) may include a hardware structure specified for artificial intelligence model processing. An artificial intelligence model may be generated by machine learning. Such learning may be performed, e.g., by the electronic device 801 where the artificial intelligence is performed or via a separate server (e.g., the server 808). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input module 850 may receive a command or data to be used by another component (e.g., the processor 820) of the electronic device 801, from the outside (e.g., a user) of the electronic device 801. The input module 850 may include, for example, a microphone, a mouse, a keyboard, a key (e.g., a button), or a digital pen (e.g., a stylus pen).

The sound output module 855 may output sound signals to the outside of the electronic device 801. The sound output module 855 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 860 may visually provide information to the outside (e.g., a user) of the electronic device 801. The display module 860 may include, for example, a display, a hologram device, or a projector and control circuitry to control a corresponding one of the display, hologram device, and projector. According to an embodiment, the display module 860 may include a touch sensor adapted to detect a touch, or a pressure sensor adapted to measure the intensity of force incurred by the touch.

The audio module 870 may convert a sound into an electrical signal and vice versa. According to an embodiment, the audio module 870 may obtain the sound via the input module 850, or output the sound via the sound output module 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, a SD card connector, or an audio connector (e.g., a headphone connector).

The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or infrared data association (IrDA)) or the second network 899 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The wireless communication module 892 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 892 may support a high-frequency band (e.g., the mmWave band) to achieve, e.g., a high data transmission rate. The wireless communication module 892 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 892 may support various requirements specified in the electronic device 801, an external electronic device (e.g., the electronic device 804), or a network system (e.g., the second network 899). According to an embodiment, the wireless communication module 892 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 897 may transmit or receive a signal or power to or from the outside (e.g., the external electronic device) of the electronic device 801. According to an embodiment, the antenna module 897 may include an antenna including a radiating element composed of a conductive material or a conductive pattern formed in or on a substrate (e.g., a printed circuit board (PCB)). According to an embodiment, the antenna module 897 may include a plurality of antennas (e.g., array antennas). In such a case, at least one antenna appropriate for a communication scheme used in the communication network, such as the first network 898 or the second network 899, may be selected, for example, by the communication module 890 (e.g., the wireless communication module 892) from the plurality of antennas. The signal or the power may then be transmitted or received between the communication module 890 and the external electronic device via the selected at least one antenna. According to an embodiment, another component (e.g., a radio frequency integrated circuit (RFIC)) other than the radiating element may be additionally formed as part of the antenna module 897.

According to various embodiments, the antenna module 897 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 or 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, mobile edge computing (MEC), or client-server computing technology may be used, for example. The electronic device 801 may provide ultra low-latency services using, e.g., distributed computing or mobile edge computing. In another embodiment, the external electronic device 804 may include an internet-of-things (IoT) device. The server 808 may be an intelligent server using machine learning and/or a neural network. According to an embodiment, the external electronic device 804 or the server 808 may be included in the second network 899. The electronic device 801 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore®), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 9:
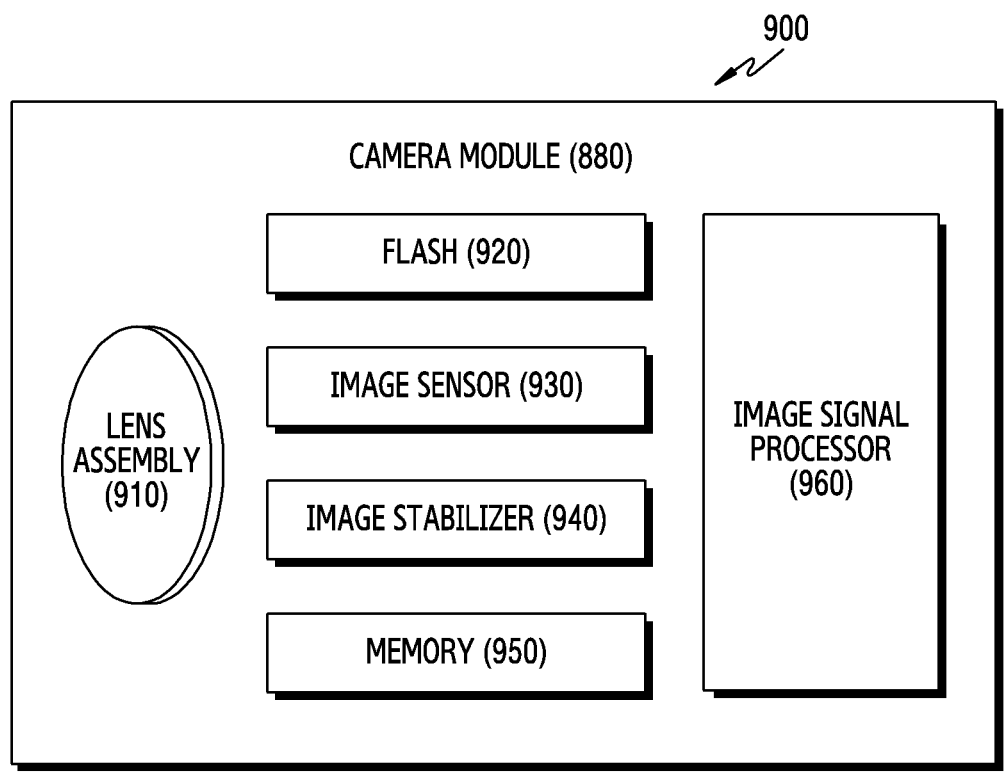
FIG. 9 is a block diagram illustrating a camera module according to an embodiment of the disclosure.

FIG. 9 is a block diagram 900 illustrating the camera module 880 according to various embodiments.

Referring to FIG. 9, the camera module 880 may include a lens assembly 910, a flash 920, an image sensor 930, an image stabilizer 940, memory 950 (e.g., buffer memory), or an image signal processor 960. The lens assembly 910 may collect light emitted or reflected from an object whose image is to be taken. The lens assembly 910 may include one or more lenses. According to an embodiment, the camera module 880 may include a plurality of lens assemblies 910. In such a case, the camera module 880 may form, for example, a dual camera, a 360-degree camera, or a spherical camera. Some of the plurality of lens assemblies 910 may have the same lens attribute (e.g., view angle, focal length, auto-focusing, f number, or optical zoom), or at least one lens assembly may have one or more lens attributes different from those of another lens assembly. The lens assembly 910 may include, for example, a wide-angle lens or a telephoto lens.

The flash 920 may emit light that is used to reinforce light reflected from an object. According to an embodiment, the flash 920 may include one or more light emitting diodes (LEDs) (e.g., a red-green-blue (RGB) LED, a white LED, an infrared (IR) LED, or an ultraviolet (UV) LED) or a xenon lamp. The image sensor 930 may obtain an image corresponding to an object by converting light emitted or reflected from the object and transmitted via the lens assembly 910 into an electrical signal. According to an embodiment, the image sensor 930 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 930 may be implemented using, for example, a charged coupled device (CCD) sensor or a complementary metal oxide semiconductor (CMOS) sensor.

The image stabilizer 940 may move the image sensor 930 or at least one lens included in the lens assembly 910 in a particular direction, or control an operational attribute (e.g., adjust the read-out timing) of the image sensor 930 in response to the movement of the camera module 880 or the electronic device 801 including the camera module 880. This allows compensating for at least part of a negative effect (e.g., image blurring) by the movement on an image being captured. According to an embodiment, the image stabilizer 940 may sense such a movement by the camera module 880 or the electronic device 801 using a gyro sensor (not shown) or an acceleration sensor (not shown) disposed inside or outside the camera module 880. According to an embodiment, the image stabilizer 940 may be implemented, for example, as an optical image stabilizer.

The memory 950 may store, at least temporarily, at least part of an image obtained via the image sensor 930 for a subsequent image processing task. For example, if image capturing is delayed due to shutter lag or multiple images are quickly captured, a raw image obtained (e.g., a Bayer-patterned image, a high-resolution image) may be stored in the memory 950, and its corresponding copy image (e.g., a low-resolution image) may be previewed via the display module 860. Thereafter, if a specified condition is met (e.g., by a user's input or system command), at least part of the raw image stored in the memory 950 may be obtained and processed, for example, by the image signal processor 960. According to an embodiment, the memory 950 may be configured as at least part of the memory 830 or as a separate memory that is operated independently from the memory 830.

The image signal processor 960 may perform one or more image processing with respect to an image obtained via the image sensor 930 or an image stored in the memory 950. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 960 may perform control (e.g., exposure time control or read-out timing control) with respect to at least one (e.g., the image sensor 930) of the components included in the camera module 880. An image processed by the image signal processor 960 may be stored back in the memory 950 for further processing, or may be provided to an external component (e.g., the memory 830, the display module 860, the electronic device 802, the electronic device 804, or the server 808) outside the camera module 880. According to an embodiment, the image signal processor 960 may be configured as at least part of the processor 820, or as a separate processor that is operated independently from the processor 820. If the image signal processor 960 is configured as a separate processor from the processor 820, at least one image processed by the image signal processor 960 may be displayed, by the processor 820, via the display module 860 as it is or after being further processed.

According to an embodiment, the electronic device 801 may include a plurality of camera modules 880 having different attributes or functions. In such a case, at least one of the plurality of camera modules 880 may form, for example, a wide-angle camera and at least another of the plurality of camera modules 880 may form a telephoto camera. Similarly, at least one of the plurality of camera modules 880 may form, for example, a front camera and at least another of the plurality of camera modules 880 may form a rear camera.

What is claimed is:

1. An electronic device comprising:
   a camera;
   at least one processor electrically coupled to the camera; and
   memory storing instructions that, when executed by the at least one processor individually or collectively, cause the electronic device to:

obtain a plurality of image frames through the camera, in response to a shooting start command, obtain a shooting command subsequent to the shooting start command, determine a shooting environment, determine a first number, based on the shooting environment, select the first number of image frames from among the plurality of image frames obtained before the shooting command, in response to the shooting command, and generate a first image synthesized based on the selected first number of image frames.

2. The electronic device of claim 1, wherein a timer is executed in response to the shooting start command, and wherein the instructions, when executed by the at least one processor individually or collectively, cause the electronic device to store the plurality of image frames in the memory in response to the shooting command subsequent to the shooting start command, in a state where the timer is running.

3. The electronic device of claim 2, wherein the instructions, when executed by the at least one processor individually or collectively, cause the electronic device to initialize the timer in response to the shooting command.

4. The electronic device of claim 2, wherein the instructions that, when executed by the at least one processor individually or collectively, cause the electronic device to delete the plurality of image frames stored in the memory in response to an expiry of the timer.

5. The electronic device of claim 2, wherein the instructions, when executed by the at least one processor individually or collectively, cause the electronic device to:

determine whether at least one image frame obtained before the shooting start command is stored in the memory;

when the at least one image frame is not stored in the memory, select a second number of image frames from among the plurality of image frames obtained after the shooting start command; and generate a second image synthesized based on the selected second number of image frames.

6. The electronic device of claim 1, wherein, when the first number of image frames are selected, the instructions, when executed by the at least one processor individually or collectively, cause the electronic device to select the image frames in a reverse order by which each of the plurality of image frames is obtained.

7. The electronic device of claim 1, wherein the instructions, when executed by the at least one processor individually or collectively, cause the electronic device to:

select at least one image frame from among the plurality of image frames obtained before the shooting command in response to the shooting command, select at least one image frame from among the plurality of image frames obtained after the shooting command, and generate a third image synthesized based on the selected image frames.

8. The electronic device of claim 1, wherein the instructions, when executed by the at least one processor individually or collectively, cause the electronic device to:

select a criterion image and at least one reference image from among the plurality of image frames, and generate an image with improved quality by synthesizing the criterion image and the at least one reference image.

9. The electronic device of claim 1, wherein the instructions, when executed by the at least one processor individually or collectively, cause the electronic device to:

encode the generated first image, and store the encoded first image in the memory.

10. A method of operating an electronic device, the method comprising:

obtaining a plurality of image frames through a camera included in the electronic device, in response to a shooting start command;

obtaining a shooting command subsequent to the shooting start command;

determining a shooting environment;

determining a first number, based on the shooting environment;

selecting the first number of image frames from among the plurality of image frames obtained before the shooting command, in response to the shooting command; and generating a first image synthesized based on the selected first number of image frames.

11. The method of claim 10, further comprising:

executing a timer included in the electronic device in response to the shooting start command; and storing the plurality of image frames in a memory of the electronic device in response to the shooting command subsequent to the shooting start command, in a state where the timer is running.

12. The method of claim 11, further comprising:

initializing the timer in response to the shooting command.

13. The method of claim 11, further comprising:

deleting the plurality of image frames stored in the memory in response to an expiry of the timer.

14. The method of claim 11, further comprising:

determining whether at least one image frame obtained before the shooting start command is stored in the memory;

when the at least one image frame is not stored in the memory, selecting a second number of image frames from among the plurality of image frames obtained after the shooting start command; and generating a second image synthesized based on the selected second number of image frames.

15. The method of claim 10, wherein the selecting of the first number of image frames is selecting of the image frames in a reverse order by which each of the plurality of image frames is obtained.

16. The method of claim 10, further comprising:

selecting at least one image frame from among the plurality of image frames obtained before the shooting command, based on the shooting environment;

selecting at least one image frame from among the plurality of image frames obtained after the shooting command; and generating a third image synthesized based on the selected image frames.

17. The method of claim 10, further comprising:

encoding the generated first image; and storing encoded first image in memory of the electronic device.

18. A non-transitory recording medium storing computer readable instructions configured to perform:

obtaining a plurality of image frames through a camera, in response to a shooting start command;

obtaining a shooting command subsequent to the shooting start command;

determining a shooting environment;

determining a first number, based on the shooting environment;

selecting the first number of image frames from among the plurality of image frames obtained before the shooting command, in response to the shooting command; and generating a first image synthesized based on the selected first number of image frames.

* * * * *